United States Patent
Suda et al.

[11] Patent Number: 5,864,721
[45] Date of Patent: Jan. 26, 1999

[54] FOCUS DETECTING APPARATUS

[75] Inventors: Yasuo Suda; Keiji Ohtaka; Keiji Nagata, all of Yokohama; Kenichiro Yamashita, Matsudo; Terutake Kadohara, Hiratsuka; Hitoshi Onoda, Yokohama, all of Japan

[73] Assignee: Canon Kabushiki Kaisha, Tokyo, Japan

[21] Appl. No.: 942,044

[22] Filed: Oct. 1, 1997

Related U.S. Application Data

[63] Continuation of Ser. No. 772,776, Dec. 24, 1996, abandoned.

[30] Foreign Application Priority Data

Dec. 28, 1995 [JP] Japan ..................... 7-354106

[51] Int. Cl.⁶ .................................................. G03B 13/36
[52] U.S. Cl. ............................................................. 396/114
[58] Field of Search .................................. 396/114, 111, 396/272; 250/201.2, 201.7, 201.8

[56] References Cited

U.S. PATENT DOCUMENTS

| | | | |
|---|---|---|---|
| 4,147,417 | 4/1979 | Mandler | 354/25 |
| 4,555,169 | 11/1985 | Suda et al. | 354/407 |
| 4,699,493 | 10/1987 | Koyama et al. | 354/406 |
| 4,792,669 | 12/1988 | Ohnuki et al. | 250/201 |
| 4,808,808 | 2/1989 | Karasaki et al. | 250/201.2 |
| 4,841,326 | 6/1989 | Koyama et al. | 354/406 |
| 4,878,078 | 10/1989 | Koyama et al. | 354/402 |
| 4,992,819 | 2/1991 | Ohtaka et al. | 354/408 |
| 5,212,514 | 5/1993 | Goto | 354/402 |
| 5,428,420 | 6/1995 | Akashi et al. | 396/111 |
| 5,440,367 | 8/1995 | Suda | 354/402 |
| 5,597,999 | 1/1997 | Kinba et al. | 250/201.7 |

FOREIGN PATENT DOCUMENTS

| | | |
|---|---|---|
| 61-15112 | 1/1986 | Japan . |
| 62-173412 | 7/1987 | Japan . |
| 63-243906 | 10/1988 | Japan . |
| 4-98236 | 3/1992 | Japan . |

*Primary Examiner*—W. B. Perkey
*Attorney, Agent, or Firm*—Fitzpatrick, Cella, Harper & Scinto

[57] ABSTRACT

There is disclosed a focus detecting apparatus capable of detecting the focus state of an objective lens in a wide viewing field, comprises a view finder optical unit for observing the image formed by the objective lens, an optical unit for forming a pair of optical amount distributions, based on light beams passing through different areas of the pupil of the objective lens, wherein the optical unit being provided, at the light incident side, with a concave face directed to the light incident side, and, at the light exit side, with a convex face directed to the light exit side, a sensor unit for received said pair of the optical amount distributions, a main mirror positioned in the optical path from the objective lens to the optical unit and adapted to reflect the light beams from the objective lens toward the finder optical unit, and a reflecting mirror having a concave curved face directed to the light entrance side and adapted to reflect the light beams, transmitted by the main mirror, in a direction opposite to the finder optical system and toward the optical unit.

16 Claims, 11 Drawing Sheets

FOCUS DETECTING APPARATUS

This application is a continuation of application Ser. No. 08/772,776, filed Dec. 24, 1996, now abandoned.

BACKGROUND OF THE INVENTION

1. Field of the Invention

The present invention relates to a focus detecting apparatus adapted for use in a photographic camera, a video camera, an observing apparatus or the like and an optical equipment utilizing such focus detecting apparatus, and more particularly to a focus detecting apparatus which is capable of dividing the pupil of an objective lens (phototaking lens) into plural areas, forming the distributions of optical amount on plural object images utilizing the light beams passing through such plural areas, and determining the relative positional relationship of such plural distributions of optical amount, thereby detecting the focus state of the objective lens for pluralareas, in two-dimensional or continuous manner, over a wide range within the image frame.

2. Related Background Art

Among the conventional passive focus detecting methods utilizing the light beam passing through an objective lens, there is already known so-called image aberration method (phase difference detection method).

FIG. 12 is a schematic view of the optical system (optical equipment) of a focus detecting apparatus utilizing such conventional image aberration method, wherein shown are an objective lens (phototaking lens) 101, a half-transmitting main mirror 102, a focusing screen 103, a pentagonal roof prism 104, an eyepiece lens 105, a sub mirror 106, a film (photosensitive plane) 107, and a focus detecting apparatus 108.

Referring to FIG. 12, a light beam coming from an unshown object is transmitted by the objective lens 101, then reflected upwards by the main mirror 102 and forms an image of the object on the focusing screen 103. The object image formed on the focusing screen 103 is reflected plural times by the pentagonal roof prism 105 and is viewed by an photographer or an observer through the eyepiece lens 105.

On the other hand, a part of the light beam reaching the main mirror 102 through the objective lens 101 is transmitted by a transmitting portion of the main mirror 102, then reflected downwards by the sub mirror 106 and is guided to the focus detecting apparatus 108.

FIG. 13 is a schematic developed view showing only the objective lens 101 and the focus detecting apparatus 108 shown in FIG. 12, for the purpose of explaining the principle of focus detection.

Referring to FIG. 13, in the focus detecting apparatus 108 there are shown a field mask 109 positioned in the vicinity of a plane conjugate with the anticipated focal plane of the objective lens 101 or the plane of the film; a field lens 110 positioned similarly in the vicinity of the anticipated focal plane; a secondary imaging system 111 consisting of two lenses 111-1, 111-2; a photoelectric converting elements 112 including two photosensor arrays 112-1, 112-2 positioned respectively corresponding to and behind the two lenses 111-1, 111-2; a diaphragm 113 having two apertures 113-1, 113-2 positioned respectively corresponding to the two lenses 111-1, 111-2; and an exit pupil 114 of the objective lens 101, including two divided areas 114-1, 114-2.

The field lens 110 serves to focus the apertures 113-1, 113-2 of the diaphragm 113 on or in the vicinity of the areas 114-1, 114-2 in the exit pupil 114 of the objective lens 101, whereby light beams 115-1, 115-2 passing through the areas 114-1, 114-2 of the exit pupil 114 respectively form the optical amount distributions of the object image on the two sensor arrays 112-1, 112-2.

The system of the focus detecting apparatus shown in FIG. 13 is generally called the phase difference detecting method (image aberration method). When the focus of the objective lens 101 is positioned in front of the anticipated focal plane, namely closer to the objective lens 101, the optical amount distributions of the object image, respectively formed on the two sensor arrays 112-1, 112-2, become positioned mutually closer. Inversely, when the focus of the objective lens 101 is positioned behind the anticipated focal plane, namely farther from the objective lens 101, the optical amount distributions of the object image, respectively formed on the two sensor arrays 112-1, 112-2, become mutually separated.

The amount of aberration of the two optical amount distributions of the object image, formed on the two sensor arrays 112-1, 112-2, is in a functional relationship with the amount of defocus of the objective lens 101, namely the focus. Thus such amount of aberration is calculated by suitable calculation means of detect the direction and the amount of defocus by using the focus of the objective lens 101.

In relation to such focus detecting apparatus, there have been contentionally made proposals for increasing the number of distance measuring points or expanding the viewing field, as disclosed for example in the Japanese Patent Laid-open Application No. 4-98236 and in the U.S. Pat. No. 4,147,417 and the like. These proposals are to achieve the expansion of the viewing field by disposing behind the main mirror of the single lens reflex camera, an optical member for convergingly reflecting the light beam transmitted by the objective lens.

The configuration disclosed in the Japanese Patent Laid-open Application No. 4-98236 is provided, behind the main mirror of the single lens reflex camera, a reflecting mirror which serves as a field mirror for forming two secondary object images by the two light beams passing through different specified areas of the pupil of the objective lens, whereby the focus state of the objective lens is detected based on the relative positional relationship of such secondary object images. However, the configuration of the Japanese Patent Laid-open Application No. 4-98236 has been associated with a drawback that the light inversely entering through the view finder system is also received by the focus detecting system as ghost light, since the light beam reflected by the field mirror is guided, after the light beam is reflected by about 90° by the main mirror, to the bottom portion of the mirror box.

Also the configuration disclosed in the U.S. Pat. No. 4,147,417 is provided, similarly behind the main mirror of the single lens reflex camera, with a rear reflecting mirror having a converging power, for forming two secondary object images by the two light beams passing through different specified portions of the pupil of the objective lens.

The configurating in the U.S. Pat. No. 4,147,417 is principally different from the configuration of the Japanese Patent Laid-open Application No. 4-98236 in that the light reflected by the field mirror is directed in the diagonally front direction, through the main mirror. Such configuration allows to prevent the drawback of entry of the inversely entering light from the view finder system toward the focus detecting system.

On the other hand, the Japanese Patent Laid-open Application No. 63-243906 discloses a technical art for preventing the error in focus detection, owing to the color of the object, namely the wavelength of the light.

FIG. 14 is a schematic view of such technical art applied to the focus detecting apparatus shown in FIG. 13. In FIG. 14, there are shown a field lens 201, an infrared cut-off filter 202, a diaphragm 203 having a pair of apertures, and a re-imaging system 204 having a concave light incident surface and a pair of convex light exit surfaces. The light from the object, transmitted through an unrepresented objective lens, enters the field lens from the left in FIG. 14, and emerges from the re-imaging system 204 thereby forming a pair of secondary object images on a photoelectric converting element 205, which is supported in a sensor package 206. The light incident surface of the re-imaging system 204 is formed with a mild concave face to avoid steep refraction of the light entering the re-imaging lens 204, thereby suppressing the influence of the color aberration.

In the optical equipment incorporating the conventional focus detecting apparatus shown in FIG. 12, the light beam necessary for the focus detection is guided to the focus detecting apparatus 108 through the sub-mirror 106. Consequently the area allowing focus detection within the image frame is inevitably limited by the size (area) of the sub-mirror 106. Because of the positional relationship with the main mirror 102, it is difficult to expand the sub-mirror 106 particularly in the upward direction. It has therefore not been possible to expand the focus detecting area toward the upper part of the photographic film 107, or toward the lower part of the object field.

In the configuration shown in FIG. 12, in order to increase the area of the sub-mirror 106 without interference with the main mirror 102, it is conceivable to position the sub-mirror 106 more backwards. In such case, however, the anticipated focal plane of the objective lens 101, formed after reflection by the sub mirror 106, is displaced upwards so that the anticipated focal plane becomes separated from the focus detecting system 108 and the field lens (field lens 110 in case of FIG. 13) in the focus detecting apparatus 108 has to be made considerably larger. Such requirement constitutes a significant hindrance in disposing the focus detecting apparatus in the bottom portion of the camera.

In order not to increase the size of the field lens it is conceivable to displace the position of the field lens upwards corresponding to the upward displaced anticipated focal plane, but, in such arrangement, the field lens inevitably intercepts the phototaking light beam and has therefore to be retracted from the phototaking light beam at the phototaking operation. Such retraction required a very complex mechanical structure, which is not only costly but also cannot ensure the precision comparable to that in the conventional focus detecting apparatus.

On the other hand, the photoelectric converting element employed in the conventional focus detecting apparatus is principally a line sensor, so that the substantial area allowing focus state detection is limited to a very limited area, in fact a point or a line portion within the phototaking image area.

Also in the conventional technology there is already known a focus detecting apparatus having plural focus detecting systems and allowing focus detection in plural areas, but, in such device, the focus detecting areas are mutually isolated and the focusing operation is not possible for an object positioned between such focus detecting areas.

There have already been proposed, in such conventional focus detecting apparatus, technical arts for expanding the focus detecting area or suppressing the generation of color aberration in the peripheral part of the focus detecting area. However the optical configuration proposed in the Japanese Patent Laid-open Application No. 63-243906 has been associated with a major drawback that the further increase in the number of distance measuring points or the expansion of the viewing field is difficult.

Though the presence of a mirror having a converging power in an oblique position behind the main mirror of the single lens reflex camera is effective for expanding the viewing field as explained in the foregoing, it is difficult to effectively apply such re-imaging system composed of a concave face and a convex face in the re-imaging portion of the focus detecting optical system proposed in the U.S. Pat. No. 4,147,417. This is because the color aberration, generated by the oblique positioning of the field lens relative to the optical axis, is extremely large and is not negligible though such re-imaging system is so constructed as not to cause steep refraction of the entering light, in order to suppress the influence of the chromatic aberration.

SUMMARY OF THE INVENTION

The object of the present invention is to provide a focus detecting apparatus capable of expanding the area allowing focus detection in any position and/or in plural positions within the phototaking view field, particularly in the upper part thereof, and allowing focus detection in any point within a continuous two-dimensional area, and an optical equipment utilizing such focus detecting apparatus by properly disposing each element of optical means for focus detection provided at a side of imaging surface of objective lens, (phototaking lens).

The above-mentioned object can be attained, according to the present invention, by a focus detecting apparatus for detecting the focus state of an objective lens, comprising:

a finder optical unit for observing the image formed by the objective lens;

an optical unit for forming a pair of optical amount distributions, based on the light beams passing through different parts of the pupil of the objective lens, the optical unit having, at the light incident side, a concave face toward the light incident side, and, at the light exit side, a convex face toward the light exit side;

a sensor unit for receiving the above-mentioned pair of the optical amount distributions;

a main mirror positioned in the optical path from the objective lens to the optical unit adapted to reflect the light beam, coming from the objective lens, to the view finder optical unit; and a reflective mirror having a curved face concave to the light incident side and adapted to reflect the light, transmitted by the main mirror, in a direction opposite to the view finder optical system and toward the optical unit;

thereby enabling satisfactory detection of the focus state over a wide viewing field of the objective lens.

DESCRIPTION OF THE PREFERRED EMBODIMENTS

Figure 1:
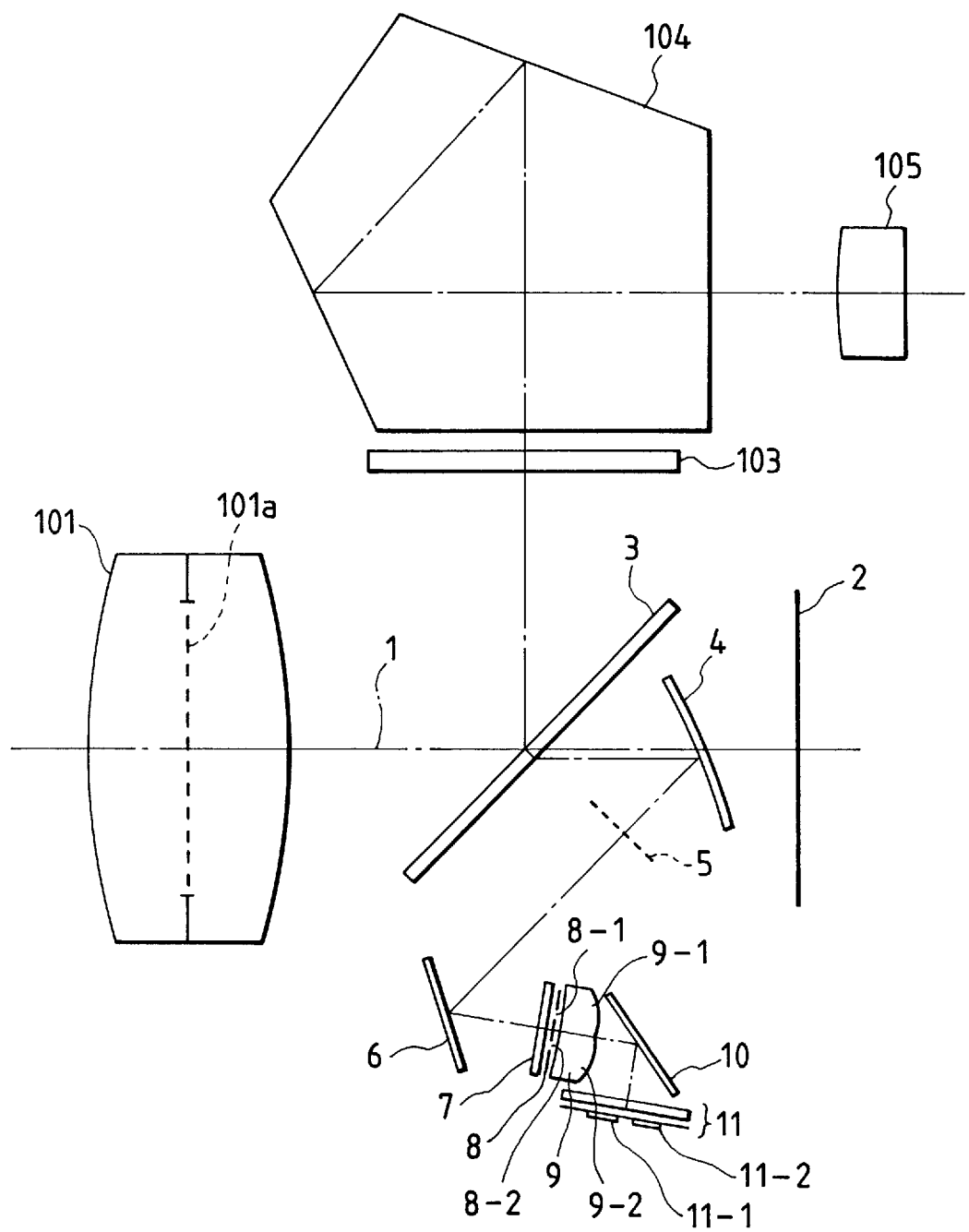
FIG. 1 is a schematic view showing the principal parts of an embodiment 1 of the present invention.
Figure 2:
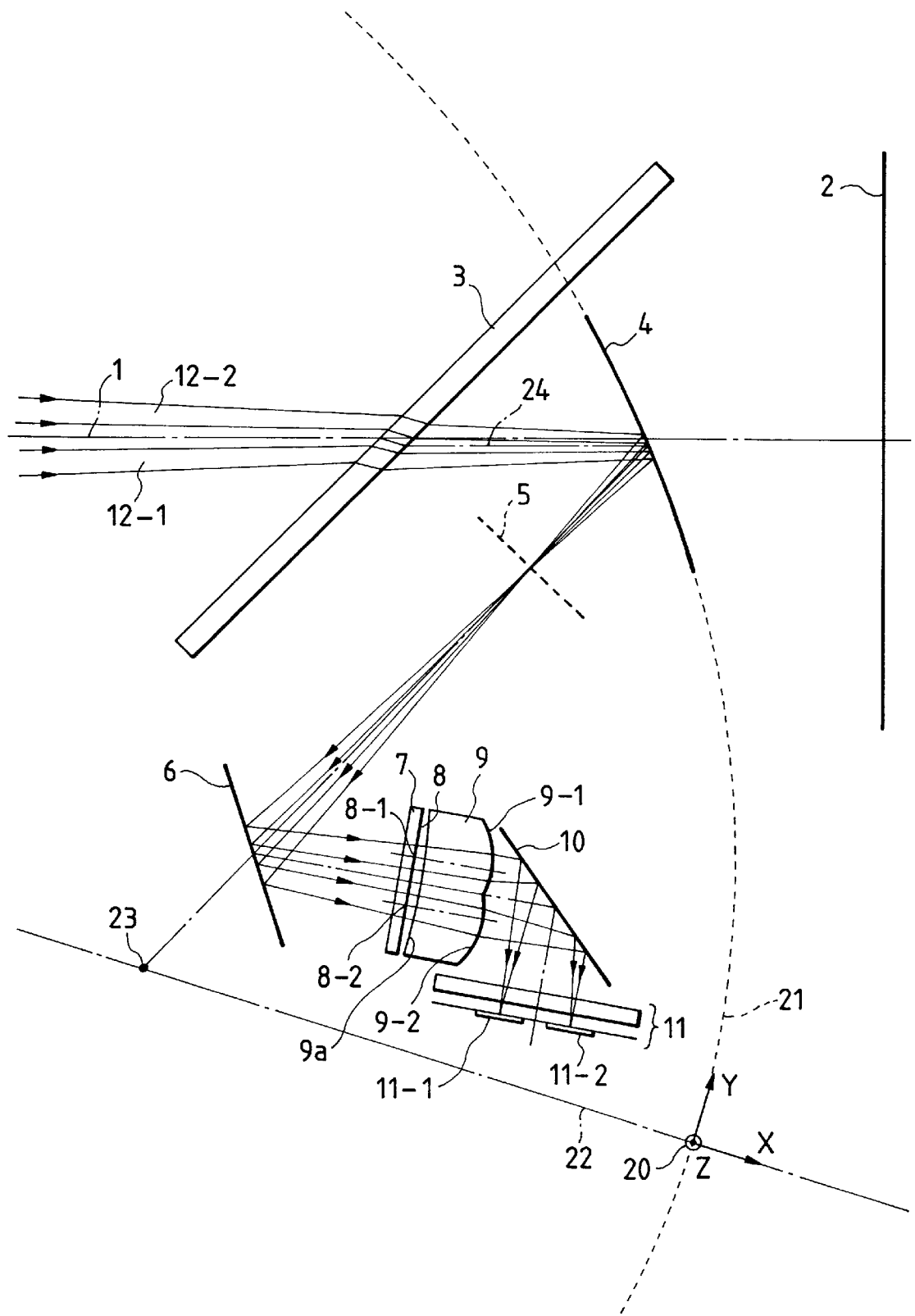
FIG. 2 is a magnified view of a part of the focus detecting apparatus shown in FIG. 1.

FIG. 1 is a schematic view showing principal parts of an embodiment of the focus detecting apparatus of the present invention applied to an optical equipment such as a camera, and FIG. 2 is a schematic view of principal parts constituting the focus detecting apparatus shown in FIG. 1.

In these drawings, there are shown an objective lens 101; an optical axis 1 thereof; a film (imaging plane) 2; a half-transmitting main mirror 3 positioned on the optical axis 1 of the objective lens 101; a focusing screen 103 on which the image of the object is formed by the objective lens 101 by way of the main mirror 3; a pentagonal roof prism 104; and an eyepiece lens 105 for observing the object image formed on the focusing screen 103.

A first reflective mirror 4, positioned at the image plane side of the objective lens 101 in oblique manner relative to the optical axis 1 thereof and having a reflective member at the light incident side, is composed of a concave mirror or an elliptical mirror having a converging power, etc. An image of the object is formed on a paraxial focal plane 5, formed by the first mirror 4, conjugate with the photographic film 2. There are also shown a second mirror 6, an infrared cut-off filter 7, a diaphragm 8 having two apertures 8-1, 8-2, a secondary imaging system 9 having two lenses 9-1, 9-2 positioned respectively corresponding to the two apertures 8-1, 8-2 of the diaphragm 8, a third mirror 10, and a photoelectric converting element (light receiving means) 11 having two area sensors 11-1, 11-2. The first mirror 4, the second mirror 6 and the secondary imaging system 9 and the line constitute components of the optical means.

In the present embodiment, the first mirror 4 has a condensing curvature and projects the two apertures 8-1, 8-2 of the diaphragm 8 in the vicinity of the exit pupil 101a of the objective lens 101.

The first mirror 4 is provided with a deposited metal film such as of aluminum or silver so as to reflect the light only in a necessary area, thereby serving also as a field mask (limiting means) for limiting the area of focus state detection. Also other mirrors 6, 10 are provided with light-reflecting deposited films only in the minimum necessary areas, in order to reduce the stray light entering the photoelectric converting element 11. Also each of these mirrors is provided with limiting means such as light-absorbing paint coated in the area not functioning for light reflection or a light-shield member positioned in the vicinity.

The secondary imaging system 9 is composed of a concave spherical light incident face 9a having the center of curvature in the vicinity of a predetermined plane 5 and a pair of convex spherical exit faces 9-1, 9-2.

Figure 3:
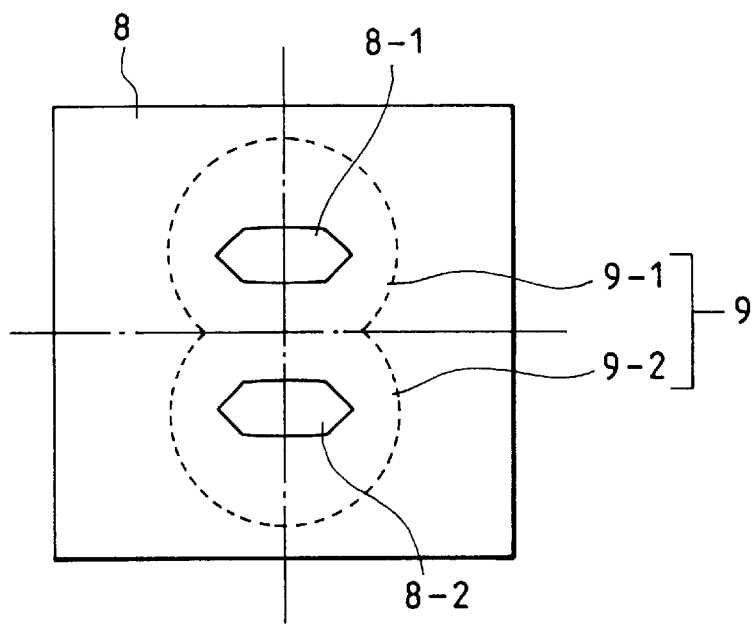
FIG. 3 is a schematic view showing a diaphragm and a secondary imaging system shown in FIG. 1.

FIG. 3 is a plan view of the diaphragm 8 shown in FIG. 1. The diaphragm 8 is provided with laterally oblong two apertures 8-1, 8-2 arranged in a direction of the smaller size of the apertures (vertical direction in the phototaking image area). In FIG. 3 represented by broken lines are the lenses 9-1, 9-2 of the above-mentioned secondary imaging system 9, positioned respectively corresponding to the apertures 8-1, 8-2 of the diaphragm 8.

Figure 4:
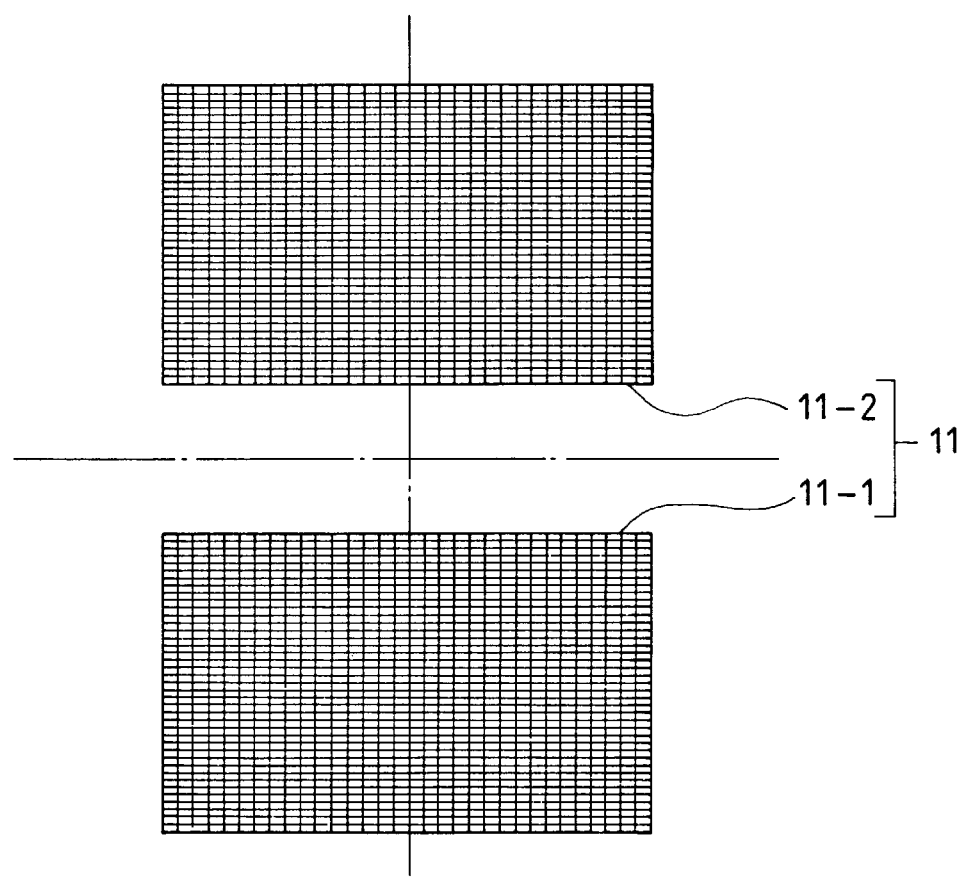
FIG. 4 is a schematic view showing a photoelectric converting element in FIG. 1.

FIG. 4 is a plan view of the photoelectric converting element 11, composed of the two area sensors 11-1, 11-2 shown in FIG. 1, each having plural pixels arranged two-dimensionally.

In the above-explained configuration, two light beams 12-1, 12-2 coming from the lens 101 shown in FIG. 1 are transmitted by the main mirror 3 and then reflected by the first mirror 4 in a direction substantially parallel to the inclination of the main mirror 3, thereby forming an image of the object on the paraxial image plane 5. In this state, the first mirror 4 forms, on the paraxial image plane, a reduced image of the object image to be formed on the image taking plane 2. The light beams from the object image formed on the paraxial image plane 5 are again deflected by reflection by the second mirror 6, then guided through the infrared cut-off filter 7 and the two apertures 8-1, 8-2 of the diaphragm 8 and condensed by the lenses 9-1, 9-2 of the secondary imaging system 9, thus respectively reaching the area sensors 11-1, 11-2 of the photoelectric converting element 11 through the third mirror 10.

The illustrated light beams 12-1, 12-2 are those focusing at the center of the film 2, but the light beams focusing at other positions reach the photoelectric converting element 11 also through a similar route, whereby two optical amount distributions relating to the object image are formed on the area sensors 11-1, 11-2 of the photoelectric converting element 11, corresponding to predetermined two-dimensional areas within the film (phototaking image field) 2.

In the present embodiment, the first mirror 4 is composed of a part of a curved surface obtained by rotating a second-order curve about an axis, and is preferably composed for a roatary elliptical surface. In the configuration shown in FIG. 2, the first mirror 4 is composed of a part of a rotary elliptical surface formed by rotating an ellipse 21, having the vertex at a point 20, about an axis 22 and provided with focal points in the vicinity of a point 23 conjugate with the center of the diaphragm 8 relative to the second mirror 6 and in the vicinity of a point (not shown) on the extension of the optical axis 24 of light beam transmitted by the main mirror 3. The above-mentioned point on the extension of the optical axis 24 is selected in the vicinity of the exit pupil of the objective lens 101 (averaged position of the exit pupils in case plural objective lenses are interchangeably used), whereby the exit pupil of the objective lens 101 substantially overlaps with the light incident position of the secondary imaging system 9.

In this manner the first mirror 4 functions as an ideal field lens. As apparent from FIG. 2, the optically used area of the first mirror 4 is a part of the rotary elliptical surface not including the rotary axis nor the vertex thereof.

More specifically, the shape of the rotary elliptical surface 4 employed in the present embodiment can be represented by:

$$x = \frac{h^2/r}{1 + \sqrt{1 - (1+k)(h/r)^2}} \quad (h^2 = y^2 + z^2)$$

wherein r=−38.5 and k=−0.37. For an ordinary camera (optical equipment) and an ordinary objective lens (phototaking lens), the preferred ranges for r and k are generally given by:

−20≦r≦−50 and −1≦k≦−0.2.

Also in the present embodiment, the light incident surface (first surface) 9a of the secondary imaging system 9 is formed with a concave surface to avoid steep refraction of the light entering the secondary imaging system, thereby securing satisfactory uniform imaging performance over wide two-dimensional areas areas on the photoelectric converting element 11.

For the two optical amount distributions of the object image obtained in the above-explained manner, there is calculated the relative positional relationship in the separating direction, namely the vertical direction of the two area sensors 11-1, 11-2 shown in FIG. 4, at each position consisting of arbitrary plural elements of the area sensors 11-1, 11-2, based on a principle similar to that of the aforementioned conventional focus detection according to the image aberration method, whereby the focus state of the objective lens 101 can be detected in an arbitrary two-dimensional area within the phototaking image frame. At the phototaking operation, the first mirror 4 is retracted, like the main mirror 3, from the phototaking optical path.

It is to be noted that a distortion is generated by the operation of imaging of the first mirror 4 in the object image on the paraxial image plane 5 and on the photoelectric converting element 11. The first mirror 4 generates a significant asymmetrical distortion aberration on the image plane 5 because it has a converging power for projecting the two apertures 8-1, 8-2 of the diaphragm 8 on in the vicinity of the exit pupil 101a of the objective lens 101 and is positioned obliquely to the optical axis 1 as explained in the foregoing.

Figure 5:
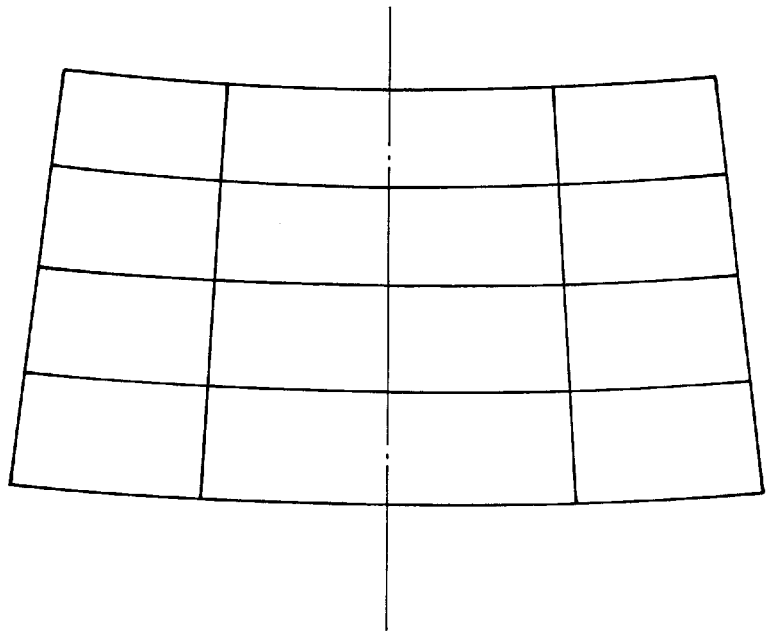
FIG. 5 is a schematic view showing the image distortion on the focal plane in FIG. 1.

FIG. 5 is a plan view showing, in a case where a rectangular grid pattern is focused on the film 2 by the objective lens 101, the distortion generated by the first mirror 4 of the present embodiment in such grid pattern formed on the imaging plane 5, wherein the upper side corresponds to the side of the main mirror 3 shown in FIG. 2.

In order to minimize such image distortion, in the present embodiment, the angle between the optical axis 24 and the normal line to the first mirror 4 at the crossing point with the optical axis 24 is maintained as small as possible, so as to reflect the light substantially along the main mirror 3, namely as frontward as possible. Consequently, a ray entering along the optical axis and a reflected ray thereof form an acute angle. The second mirror 6 is provided for guiding such frontward reflected light to the secondary imaging system 9.

A rectangular pattern on the film 2 is formed on the imaging plane 5, as shown in FIG. 5, in a sector-shaped pattern narrower at the top and wider at the bottom. If such pattern is re-focused by the secondary imaging system 9, there will be obtained a distorted image also on the photoelectric converting element 11.

Figure 6:
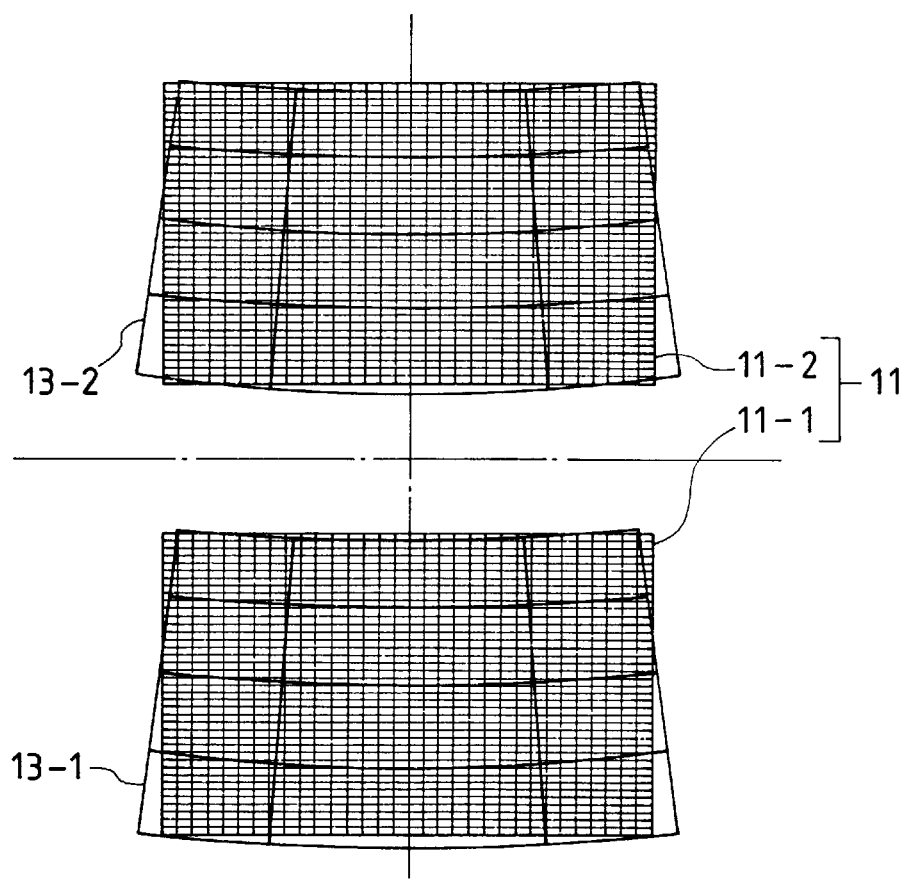
FIG. 6 is a schematic view showing the image distortion on the photoelectric converting element in FIG. 1.

FIG. 6 is a plan view of the photoelectric converting element 11, wherein distorted rectangular grid images 13-1, 13-2 are formed against the area sensors 11-1, 11-2.

The area sensor is generally formed by a cyclic arrangement of rectangular pixels in the vertical and horizontal direction, as indicated by the area sensors 11-1, 11-2 shown in FIG. 6 and usually has a rectangular external shape. On the other hand, the formation of the distorted images 13-1, 13-2 as shown in FIG. 6 means that the inversely projected images of the two rectangular area sensors 11-1, 11-2 onto the photographic film 2 will be inversely distorted and that the viewing field for performing focus detection becomes inclined in the peripheral part of the image area.

However, such inclination of the viewing field itself does not constitute a difficulty in detecting the relative positional relationship of the two object images, if the two object images formed on the two area sensors 11-1, 11-2 are similarly distorted with respect thereto. More specifically, the aberration of the two object images in the direction of column (direction of correlation) of the area sensor 11 can be corrected by the processing of the output of the photoelectric converting element for example by a method similar to that disclosed in the Japanese Patent Laid-open Application No. 62-173412, so that the focus can be satisfactorily detected as long as the two object images do not show aberration in a direction perpendicular to the direction of column (direction of correlation) of the area sensor 11.

Also in the present embodiment, each of the two object images formed on the two area sensors 11-1, 11-2 shows a significant distortion, but the discrepancy of such distortion from the direction perpendicular to the direction of column (direction of correlation) of the area sensor 11 is sufficiently small.

In a case where the discrepancy in the above-mentioned direction persists and affects the precision of the focus state detection, as disclosed in the Japanese Patent Laid-open Application No. 61-15112, it is possible to improve the precision by providing a light-shielding mask, such as an aluminum mask, which is so curved as to correspond the discrepancy of the distortion, along each column on the light-receiving surface of the sensor.

For correcting the difference between the distortions of the two object images, it is also possible to adjust the imaging magnification of the images. More specifically it is possible to so set the two lenses 9-1, 9-2 of the secondary imaging system 9 that they have different vertex positions (vertex positions of the lens faces) along the optical axis at the exit side, or to incline the entire secondary imaging system 9 with respect to the optical axis and to vary the imaging magnifications of the two lenses 9-1, 9-2. Furthermore, the magnification and the distortion of the two object images can be adjusted by inclining the photoelectric converting element 11 with respect to the optical axis.

In the focus detecting apparatus of the present embodiment, the mirror 4 provided between the objective lens 101 and the diaphragm 8 having a pair of apertures for guiding the light beams from the objective lens 101 to the diaphragm 8 is composed of a surfacial mirror to completely avoid generation of the chromatic aberration therein, whereby the chromatic aberration characteristics of the re-imaging system 9 are reflected as those of the focus detecting optical system.

Also the re-imaging system is composed of a lens provided, at the light incident side, with a single concave spherical surface having the center on the optical axis of the objective lens after deflection by the mirror, and, at the light exit side, with a pair of convex spherical surfaces which are positioned eccentrically in mutually opposite directions, wherein the center of the concave spherical surface is positioned in the vicinity of the primary imaging plane (plane 5) of the objective lens, defined by the surfacial mirror and the centers of the paired convex spherical surfaces are positioned in the vicinity of the apertures of the diaphragm.

The above-mentioned lens functions in the following manner. More specifically, the imaging plane of the object, after reflection by the mirror, is refocused by the re-imaging system in the following manner. A ray starting from a point on the optical axis and passing through the center of the aperture of the diaphragm reaches the photoelectric converting element without any substantial refraction. Since the aperture of the diaphragm has a certain finite area, the light beam passing therethrough spreads substantially uniformly around the ray passing the center of the aperture and maintains such state to the photoelectric converting elements, there by forming a point image thereon. Such behavior remains substantially constant regardless of the wavelength of the light, as the refraction angle is extremely small.

On the other hand, a light beam starting from a peripheral part of the imaging plane of the object and entering the aperture of the diaphragm is significantly refracted by the concave face of the re-imaging system and forms a point image on the photoelectric converting element 11. The point image is free from coma aberration because the center of the convex face is substantially aligned with the center of the aperture, but a chromatic aberration by the magnification is generated since the refraction angle on the concave face varies depending on the wavelength. Consequently, the formed image varies in magnification depending on the wavelength, in which the position of the point image of a point on the optical axis remains constant.

Figure 7:
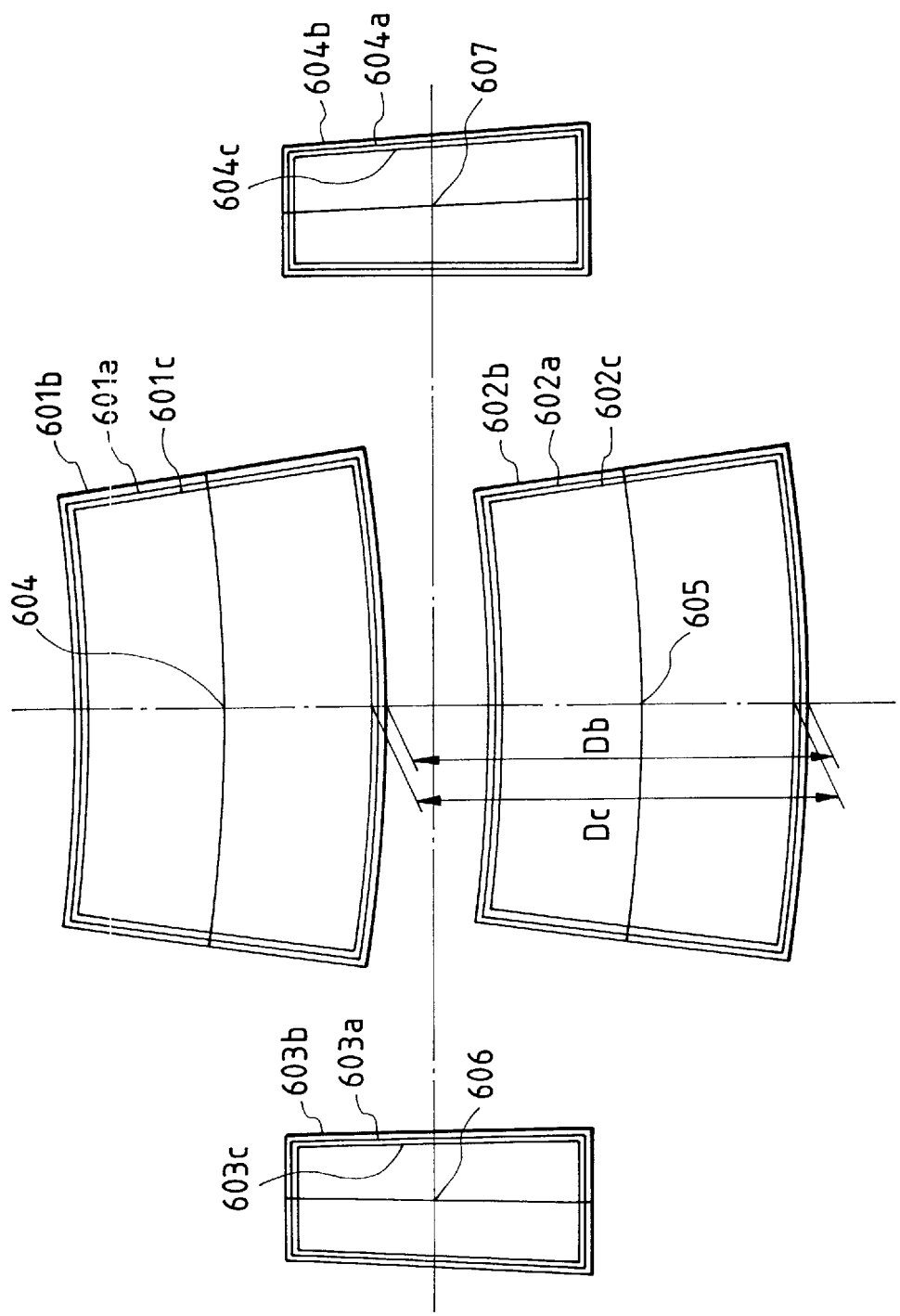
FIG. 7 is a view showing images of different wavelengths formed on the photoelectric converting element.

FIG. 7 shows such behavior, wherein secondary 1c images 601a to 601c, 602a to 602c, 603a to 603c and 604a to 604d, different in magnification depending on the wavelength, are formed respectively around points 604, 605, 606 and 607. Suffix a, b or c indicates that the image is formed with a wavelength 587.6 nm, 656.3 nm or 435.8 nm, and the difference in image resulting from that in the magnification is represented in somewhat exaggerated manner.

As apparent from a fact that the distance Db is substantially equal to the distance Dc, the reference distance required for determining the relative positional relationship of two object images remains constant regardless of the wavelength, so that the above-mentioned aberration does not affect the precision of focus detection. Thus, there is realized an ideal image formation for the focus state detection over a wide viewing field, permitting the presence of the chromatic aberration by magnification in the above-explained manner while suppressing the generation of coma aberration.

The embodiment explained in the foregoing is to form two optical amount distributions of the object image along the vertical direction of the photoelectric converting element 11 and to detect the aberration of such distributions in the vertical direction. Such focus detecting apparatus is capable of detecting the focus state for an object showing a distribution of density in the vertical direction, such as a pattern consisting of horizontal lines, but is incapable of detecting the focus state for an object showing a distribution of density in the horizontal direction, such as a pattern consisting of vertical lines.

Figure 8:
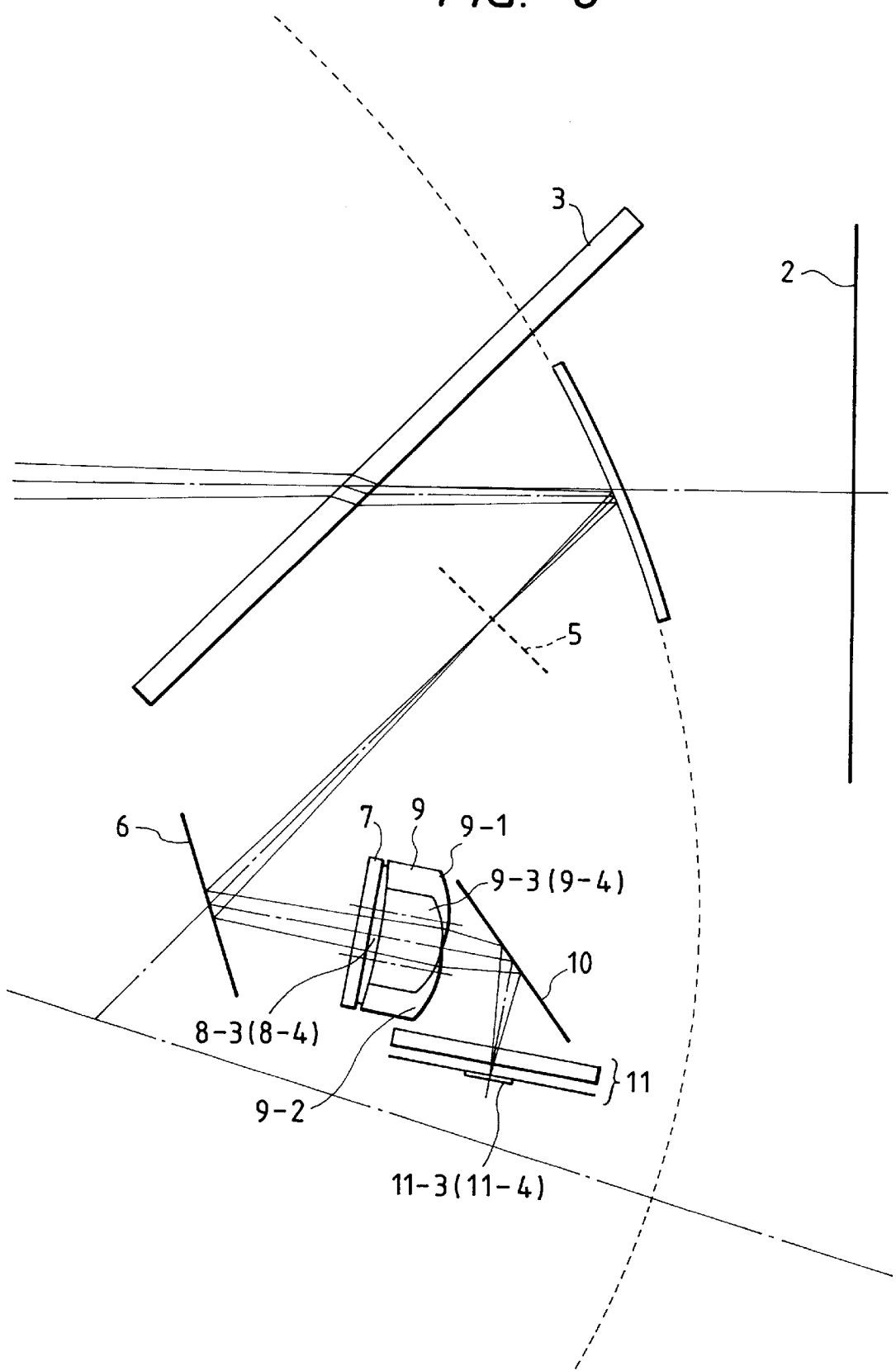
FIG. 8 is a magnified view of a part of the focus detecting apparatus constituting an embodiment 2 of the present invention.

FIG. 8 is a schematic view showing the principal parts of an embodiment 2 of the present invention, improved in the above-mentioned point. The present embodiment is different from the embodiment 1 shown in FIG. 2 in that the secondary imaging system 9 having the two lenses 9-1, 9-2 is further provided with two additional lenses 9-3, 9-4 along a direction perpendicular to the direction of the first-mentioned lenses 9-1, 9-2, and that the diaphragm 8 and the photoelectric converting element 11 are respectively provided further with additional apertures 8-3, 8-4 and additional area sensors 11-3, 11-4.

In FIG. 8, for the purpose of simplicity, the apertures 8-1, 8-2 of the diaphragm 8, the area sensors 11-1, 11-2 of the photoelectric converting element 11 and the light beams 12-1, 12-2, etc. are omitted.

Figure 9:
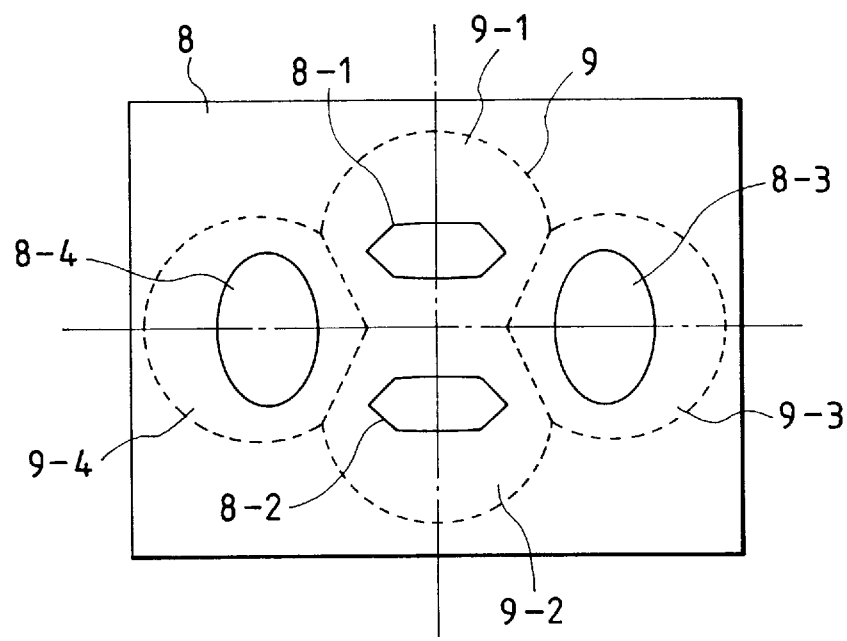
FIG. 9 is a schematic view showing a diaphragm and a secondary imaging system of the embodiment 2 of the present invention.

FIG. 9 shows the shape of the apertures of the diaphragm 8 in the present embodiment 2, wherein 8-3 and 8-4 indicate the further added apertures, and 9-3 and 9-4 indicate the two lenses of the secondary imaging system 9, provided therebehind corresponding to such apertures.

In the present embodiment, the apertures 8-3, 8-4 of the diaphragm 8, shown in FIG. 9, are positioned at the outer side, in comparison with the apertures 8-1, 8-2, in order to fetch the light of the peripheral area of the pupil of the objective lens 101. Such arrangement allows to extend so-called baseline length in the focus state detection.

The focus detecting system utilizing the newly added apertures 8-3, 8-4 of the diaphragm 8 allows to improve the precision of the focus state detection for an objective lens with a larger aperture or with a smaller F-number. It is however naturally possible also to position the apertures 8-3, 8-4 at a same distance from the center of the diaphragm 8 as that of the apertures 8-1, 8-2, thereby enabling focus state detection for an object showing the distribution of density only in the horizontal or vertical direction, regardless of the aperture of the objective lens, through the precision of focus state detection is same in both directions.

Figure 10:
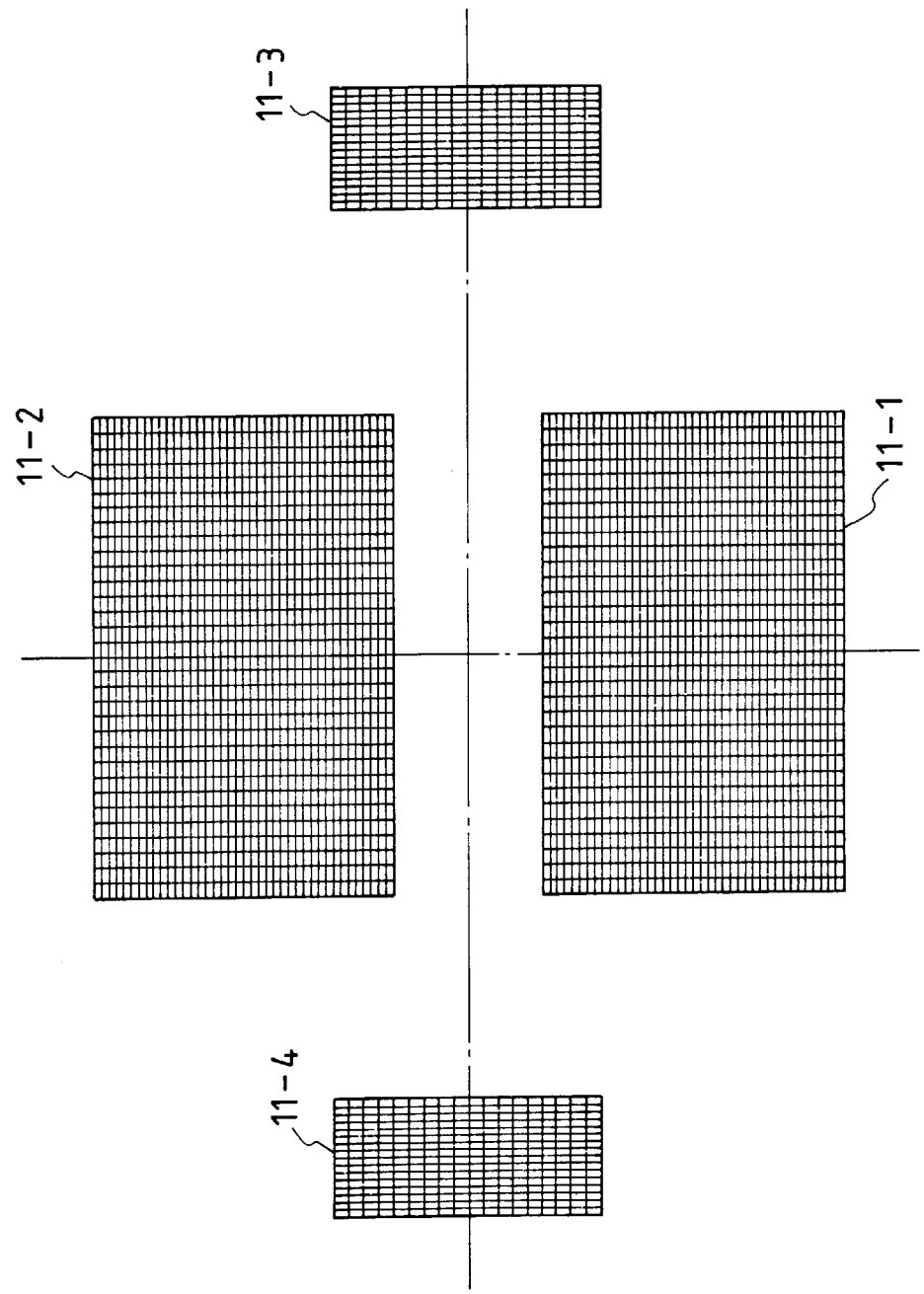
FIG. 10 is a schematic view showing a photoelectric converting element of the embodiment 2 of the present invention.

FIG. 10 shows the area sensors 11-3, 11-4 of the photoelectric converting element 11, on which the optical amount distributions are formed by the secondary imaging lenses 9-3, 9-4. Also FIG. 11 shows projected grid-pattern images on the photoelectric converting element 11 as also shown in FIG. 6.

Figure 11:
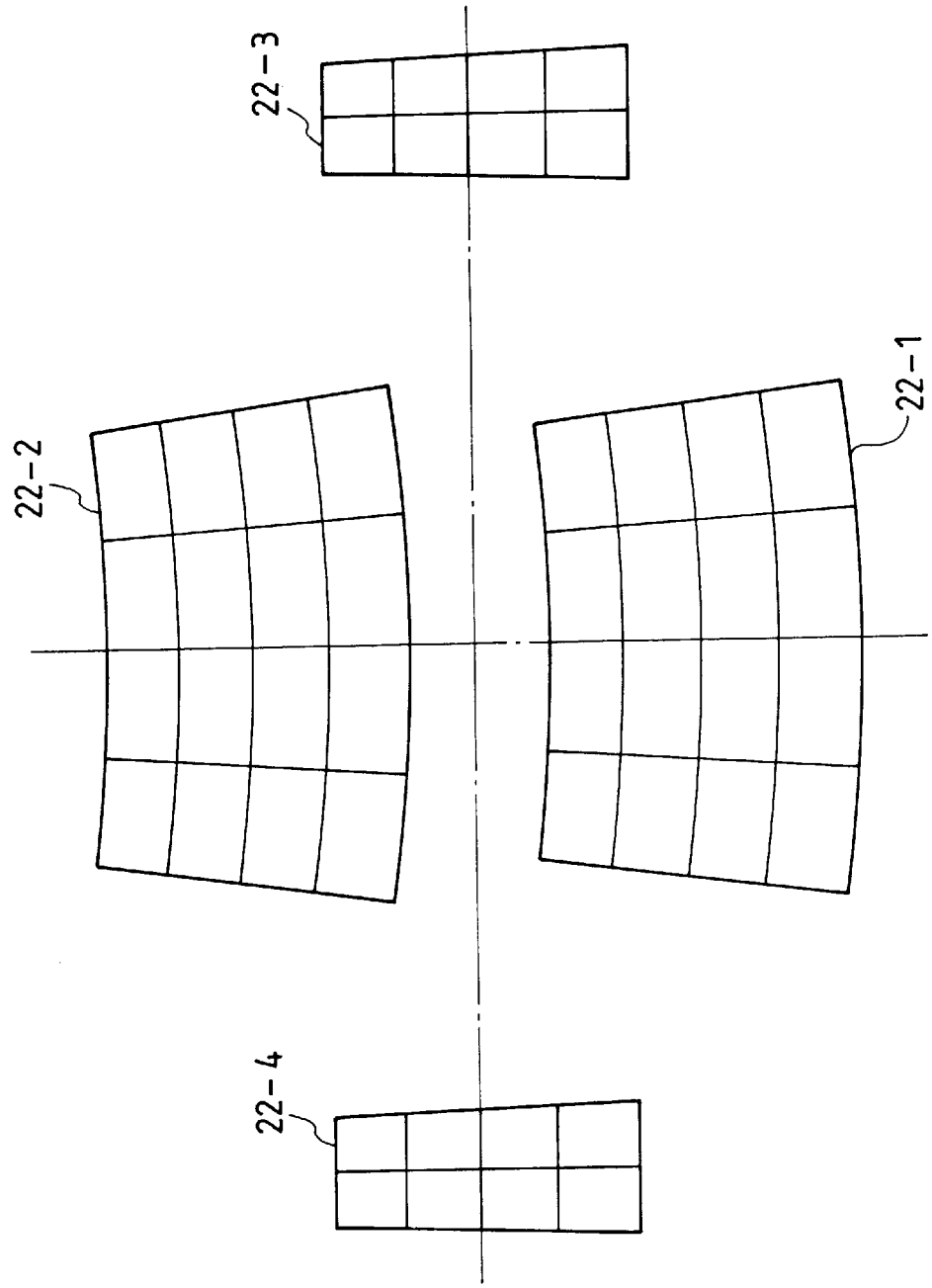
FIG. 11 is a schematic view showing an image on the photoelectric converting element of the embodiment 2 of the present invention.
Figure 12:
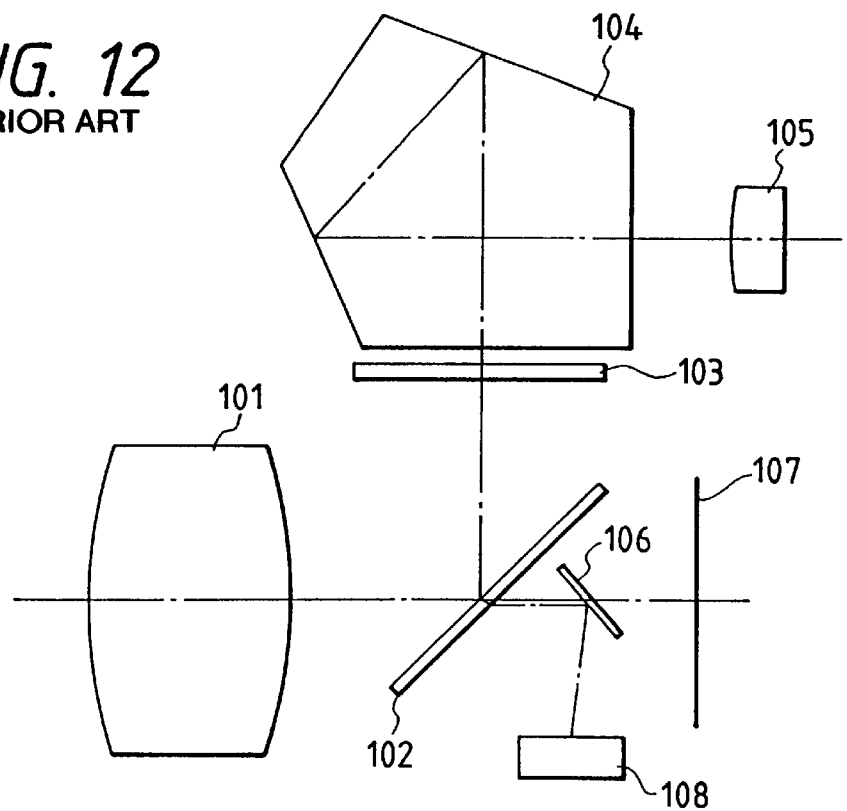
FIG. 12 is a schematic view of a camera equipped with a conventional focus detecting apparatus.
Figure 13:
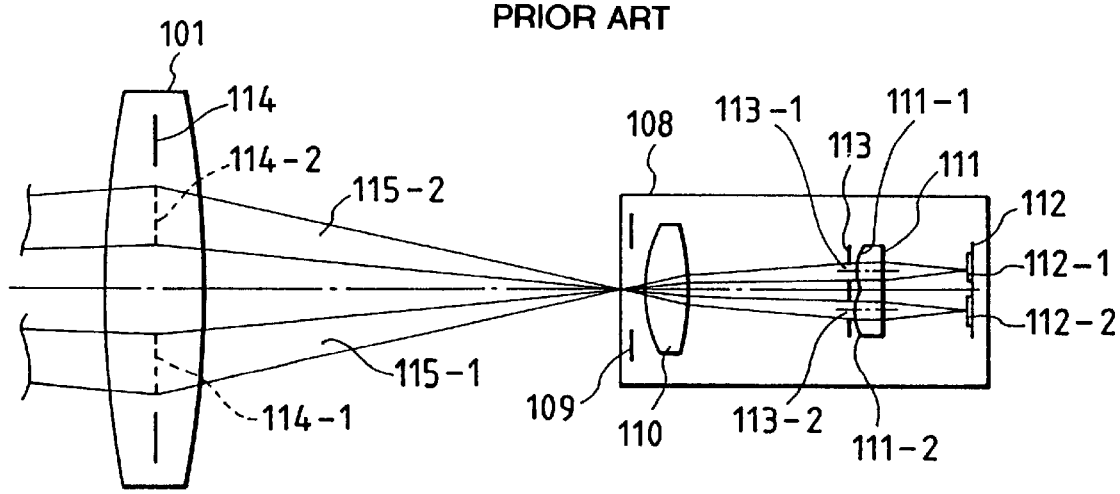
FIG. 13 is a schematic view of a conventional focus detecting apparatus.
Figure 14:
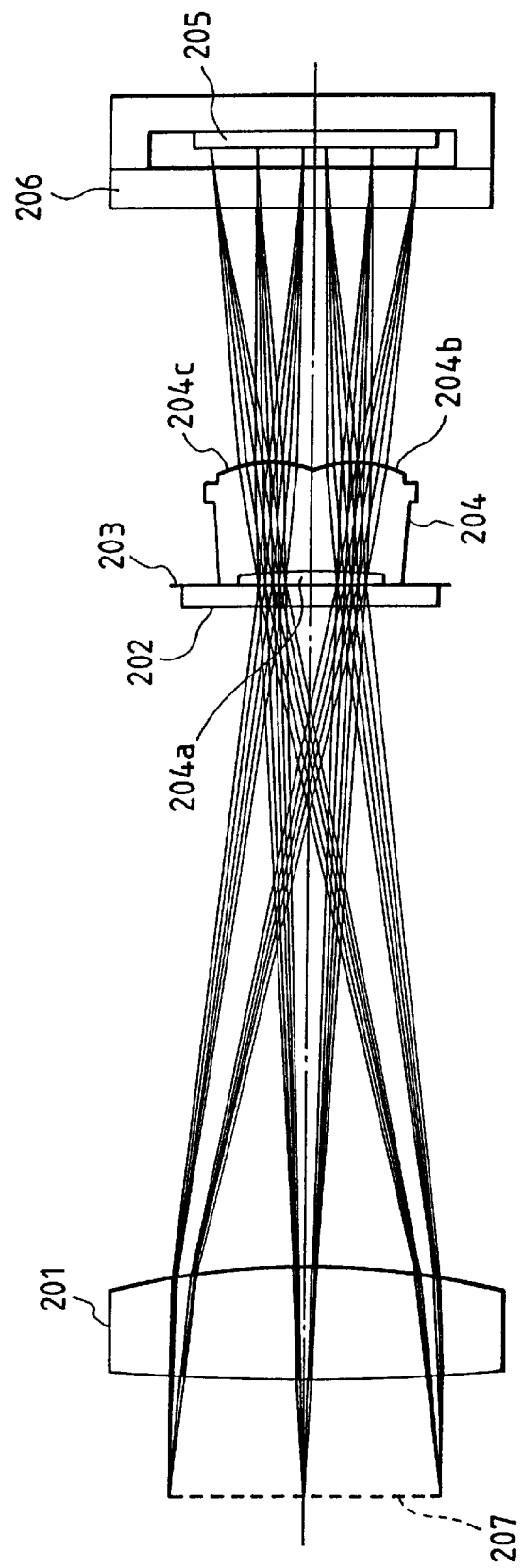
FIG. 14 is a view of a conventional re-imaging system.

In the present embodiment, as apparent from FIGS. 10 and 11, the viewing field corresponding to the area sensors 11-3, 11-4 for detecting the phase difference of the object images in the horizontal direction is selected smaller than that corresponding to the area sensors 11-1, 11-2 for detecting the phase difference of the object images in the vertical direction, for the following reason.

In the present embodiment, it is required to simultaneously reduce the distortions of the rectangular images 22-1, 22-2 shown in FIG. 11 or the difference therebetween and the distortions of the rectangular images 22-3, 22-4 or the difference therebetween, but such simultaneous reduction is not easy because the difference between the two object images becomes critical in mutually perpendicular two directions. It is also difficult to resolve such difficulty by modifying the shape of the mirrors, since the light beams forming both object images are reflected in mutually common areas on the first and second mirrors. Under such situation, it is very effective to select the baseline length shorter in one of the two sets of the object images.

Also such configuration allows to avoid the extreme increase in size of the photoelectric converting element 11, thus allowing to accommodate the focus detecting apparatus within a limited space of the camera. The detection of the focus state in an arbitrary two-dimensional area requires an enormously increased amount of calculation in comparison with the calculation in the conventional focus detecting apparatus, so that the number of pixels maintained at a necessary minimum level is effective for achieving prompt focus state detection.

The present invention has been explained by focus detecting apparatus of the phase difference detecting method, but the present invention is not limited to such method and is applicable effectively also to the focus detecting apparatus of other methods utilizing two-dimensional imaging, such as the focus detecting method based on the sharpness of the object image. On the other hand, the present invention is advantageously applicable in expanding the focus detecting area to a two-dimensional continuous area, but it is also applicable to a case of utilizing a plurality of the conventional focus detecting apparatus utilizing the one-dimensional line sensor, allowing to form the focus detecting position in the peripheral area of the viewing field.

As explained in the foregoing, the present invention provides a focus detecting apparatus capable of expanding the area allowing focus state detection in an arbitrary area in any direction within the phototaking viewing field and/or in plural areas therein, particularly in the upper part of the viewing field, and achieving highly precise focus state detection in any point in a two-dimensionally continuous area, and an optical equipment utilizing such focus detecting apparatus, by suitable setting of the optical elements for focus state detection provided at the image side of the objective (phototaking) lens.

Besides, the present invention allows to drastically expand the area allowing focus state detection, while maintaining the precision of the focus state detection. Furthermore, the area of focus state detection can be expanded to a two-dimensionally continuous area, so that the focusing to the desired object at an arbitrary position can be easily achieved, and the freedom in determining the image configuration in phototaking or observing operation can be increased.

What is claimed is:

1. A focus detecting apparatus for detecting a focus state of an objective lens, comprising:
    a finder optical unit for observing an image formed by said objective lens;
    an optical unit for forming a pair of optical amount distributions, based on light beams passing through different areas of the pupil of said objective lens, wherein said optical unit being provided, at the light incident side, with a concave face directed to the light incident side, and, at the light exit side, with a convex face directed to the light exit side;
    a sensor unit for receiving said pair of the optical amount distributions;
    a main mirror positioned in an optical path from said objective lens to said optical unit and adapted to reflect light beams from said objective lens toward said finder optical unit; and
    a reflecting mirror having a concave curved surface directed to the light incident side and adapted to reflect the light beams, transmitted by said main mirror, in a direction opposite to said finder optical system and toward said optical unit.

2. A focus detecting apparatus according to claim 1, wherein the center of curvature of said concave face of said optical unit is positioned in the vicinity of an image point formed by said objective lens and said reflecting mirror.

3. A focus detecting apparatus according to claim 1, further comprising a stop at the center of curvature of said convex face of said optical unit.

4. A focus detecting apparatus according to claim 1, wherein said reflecting mirror has an elliptical shape.

5. A focus detecting apparatus for detecting the focus state of an objective lens, comprising:
    optical means provided at an imaging plane side of said objective lens and adapted to form plural optical amount distributions relating to an object image, utilizing light beams passing through different areas of a pupil of said objective lens;
    a photoelectric converting unit including plural elements for outputting a relative positional relationship of said plural optical amount distributions; and
    a circuit for obtaining the focus state of said objective lens in one or plural areas in the viewing field, utilizing signals from said photoelectric converting unit;
    wherein said optical means includes a mirror having a converging power for reflecting the light beams from said objective lens to form an object image on a predetermined surface and a secondary imaging lens for re-focusing the object image, formed on said predetermined plane, on said photoelectric converting unit, and said secondary imaging lens has a light incident surface being concave toward the light incident side and a pair of exit surfaces being convex to the light exit side.

6. A focus detecting apparatus according to claim 5, wherein a reflecting surface of said reflecting mirror is composed of a curved surface obtained by rotating a second-order curve about an axis.

7. A focus detecting apparatus according to claim 6, wherein said reflecting surface of said reflecting mirror is composed of a curved surface obtained by rotating a second-order curve about an axis, but not having said rotary axis nor the vertex.

8. A focus detecting apparatus according to claim 6, wherein said reflecting surface of said reflecting mirror is composed of a rotary elliptical surface obtained by rotating an ellipse about an axis.

9. A focus detecting apparatus according to claim 8, wherein one of two focal points of said rotary elliptical surface is positioned in the vicinity of a ray, or the extension thereof, entering said rotary elliptical surface along the optical axis of said objective lens, and the other is positioned in the vicinity of a ray, or the extension thereof, reflected by said rotary elliptical surface.

10. A focus detecting apparatus according to claim 5, further comprising at least another mirror between said reflecting mirror and said photoelectric converting element.

11. A focus detecting apparatus according to claim 5, wherein said photoelectric converting element is a two-dimensional area sensor.

12. A focus detecting apparatus according to claim 5, wherein the center of curvature of said secondary imaging lens is positioned in the vicinity of said predetermined plane.

13. A focus detecting apparatus according to claim 5, further comprising a stop positioned in the vicinity of the center of curvature of said convex face.

14. A focus detecting apparatus according to claim 5, wherein a main mirror is disposed between said reflecting mirror and said objective lens for guiding light beams from said objective lens to a finder optical system, and said reflecting mirror is adapted to reflect light beams transmitted by said main mirror in a direction opposite to a reflecting direction of said main mirror.

15. A focus detecting apparatus for detecting a focus state of an objective lens, comprising:

a finder optical unit for observing an image formed by said objective lens;

an optical unit having a shape for forming light distributions based on light beams passing through different pupil areas of said objective lens and correcting chromatic aberration;

a sensor unit for receiving said pair of distributions;

a main mirror positioned in an optical path from said objective lens to said optical unit and adapted to reflect light beams from said objective lens toward said finder optical unit; and a reflecting mirror having a concave curved surface directed to the light incident side and adapted to reflect the light beams, transmitted by said main mirror, in a direction opposite to said finder optical system and toward said optical unit.

16. A focus detecting apparatus according to claim 15, wherein a light incident surface of said optical unit being concave concave and a light outgoing surface of said optical unit being convex.

* * * * *

UNITED STATES PATENT AND TRADEMARK OFFICE
CERTIFICATE OF CORRECTION

PATENT NO. : 5,864,721
DATED : January 26, 1999
INVENTOR(S) : Yasuo Suda et al.

It is certified that error appears in the above-identified patent and that said Letters Patent is hereby corrected as shown below:

Title page,
Item [57], ABSTRACT,
Line 3, "comprises" should read -- comprising --.
Line 7, "being" should read -- is --.
Line 11, "received said" should read -- receiving the --.

Column 1,
Line 19, "pluralareas," should read -- plural areas, -- and "in" should read -- in a --.
Line 26, "known" should read -- known a --.
Line 41, "by an" should read -- by a --.
Line 58, "a photoelectric" should read -- photoelectric --.

Column 2,
Line 24, "of detect" should read -- of detecting --.
Line 60, configurating in the" should read -- configuration in --.

Column 3,
Line 39, "in" should read -- in the --.

Column 4,
Line 31, "of" (first and second occurrences) should read -- of an --.
Line 32, "lens," should read -- lens --.

Column 5,
Line 59, "line" should read -- like --.

Column 6,
Line 60, "of light" should read -- of a light --.

Column 7,
Line 23, "areas" (second occurrence) should be deleted.

Column 8,
Line 21, "of" should read -- of a --.
Line 28, "of" should read -- of a --.
Line 33, "of" should read -- of a --.
Line 41, "correspond" should read -- correspond to --.

UNITED STATES PATENT AND TRADEMARK OFFICE
CERTIFICATE OF CORRECTION

PATENT NO.    : 5,864,721
DATED         : January 26, 1999
INVENTOR(S)   : Yasuo Suda et al.

It is certified that error appears in the above-identified patent and that said Letters Patent is hereby corrected as shown below:

Column 9,
Line 20, "there by" should read -- thereby --.
Line 42, "wavelength" should read -- wavelength of --.
Line 44, "somewhat" should read -- somewhat an --.

Column 10,
Line 36, "through" should read -- though --.
Line 37, "is" should read -- is the --.

Column 11,
Line 50, "being" should read -- is --.

Column 14,
Line 10, "concave" (second occurrence) should be deleted.

Signed and Sealed this

Twenty-third Day of April, 2002

JAMES E. ROGAN
*Director of the United States Patent and Trademark Office*

*Attest:*

*Attesting Officer*